(12) United States Patent
Runge et al.

(10) Patent No.: US 12,524,990 B2
(45) Date of Patent: Jan. 13, 2026

(54) DEVICE AND METHOD FOR PROVIDING CLASSIFIED DIGITAL RECORDINGS FOR A SYSTEM FOR AUTOMATIC MACHINE LEARNING AND FOR UPDATING A MACHINE-READABLE PROGRAM CODE THEREWITH

(71) Applicant: Robert Bosch GmbH, Stuttgart (DE)

(72) Inventors: Armin Runge, Pittsburgh, PA (US); Christian Weiss, Leonberg (DE); Gor Hakobyan, Schoenaich (DE); Stefan Leidich, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 532 days.

(21) Appl. No.: 17/854,931

(22) Filed: Jun. 30, 2022

(65) Prior Publication Data
US 2023/0007870 A1    Jan. 12, 2023

(30) Foreign Application Priority Data
Jul. 6, 2021   (DE) ...................... 10 2021 207 093.0

(51) Int. Cl.
*G06V 10/764*    (2022.01)
*G06V 10/74*    (2022.01)
*G06V 10/774*    (2022.01)

(52) U.S. Cl.
CPC .......... *G06V 10/764* (2022.01); *G06V 10/761* (2022.01); *G06V 10/774* (2022.01); *G06V 2201/07* (2022.01)

(58) Field of Classification Search
CPC .. G06V 10/764; G06V 10/761; G06V 10/774; G06V 2201/07; G06V 10/70; G06V 20/58; G06V 10/82
See application file for complete search history.

(56) References Cited

U.S. PATENT DOCUMENTS

| | | | |
|---|---|---|---|
| 2018/0136332 A1* | 5/2018 | Barfield, Jr. | ....... G06V 10/7784 |
| 2019/0354785 A1 | 11/2019 | Samii et al. | |
| 2020/0026283 A1* | 1/2020 | Barnes | .................... G06V 20/56 |
| 2021/0319311 A1* | 10/2021 | Shin | ........................ G06N 3/08 |

FOREIGN PATENT DOCUMENTS

| | | | |
|---|---|---|---|
| DE | 102018213132 A1 * | 2/2020 | |
| DE | 102018214979 A1 | 3/2020 | |
| DE | 102018220892 A1 | 6/2020 | |

* cited by examiner

*Primary Examiner* — Molly Wilburn
(74) *Attorney, Agent, or Firm* — NORTON ROSE FULBRIGHT US LLP

(57) ABSTRACT

A system and method for providing classified digital recordings, for a system for automatic machine learning. A first digital recording is captured at a first point in time which includes an object situated at the first point in time at a first distance from the recording unit. A first classification of the object is determined using the data of the first digital recording. At a second point in time, a second digital recording is captured, which includes the object situated at the second point in time at a second distance from the recording unit. A second classification of the object is determined using the data of the second digital recording. A digital recording classified using a result of the second classification is provided, which includes at least a part of the first digital recording when a result of the first classification differs from the result of the second classification.

20 Claims, 5 Drawing Sheets

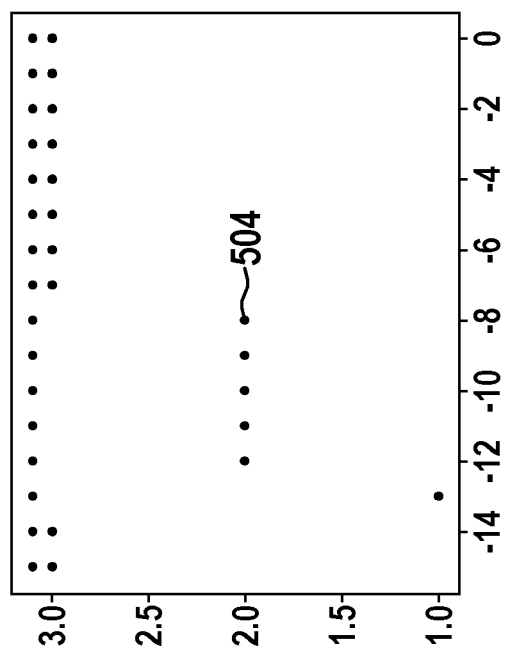
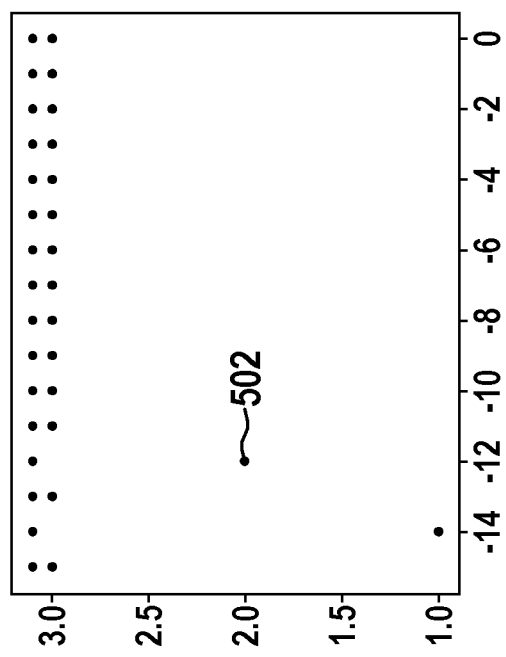
Fig. 5

DEVICE AND METHOD FOR PROVIDING CLASSIFIED DIGITAL RECORDINGS FOR A SYSTEM FOR AUTOMATIC MACHINE LEARNING AND FOR UPDATING A MACHINE-READABLE PROGRAM CODE THEREWITH

FIELD

The present invention relates to a device and to a method for providing classified digital recordings for a system for automatic machine learning and for updating a machine-readable program therewith.

BACKGROUND INFORMATION

Driver assistance systems such as an emergency braking assistant or an adaptive cruise control are implemented with video and/or radar sensors.

Essential for the quality of the driver assistance is the quality of an object type recognition.

SUMMARY

A particularly high quality of object type recognition may be achieved with a device and a method for providing classified digital recordings for a system for automatic machine learning and for updating a machine-readable program code therewith, according to the present invention.

According to an example embodiment of the present invention, an, in particular, computer-implemented method for providing classified digital recordings, in particular, radar recordings, LIDAR recordings or camera recordings, for a system for automatic machine learning, provides that at a first point in time a first digital recording is captured using a recording unit, in particular, using a radar system, a LIDAR system or a camera system, which includes an object, which is situated at the first point in time at a first distance from the recording unit, a first classification of the object is determined using the data of the initial digital recording, at a second point in time, in particular, after the first point in time, a second digital recording is captured using the recording unit, which includes the object, which is situated at the second point in time at a second distance from the recording unit, in particular, at a range to the recording device shorter compared to the first distance, a second classification of the object is determined using the data of the second digital recording, and a digital recording classified using a result of the second classification is provided, which includes at least a part of the first digital recording when a result of the first classification differs from the result of the second classification. Relevant segments and their labels are thereby automatically generated for a supervised learning.

According to an example embodiment of the present invention, it may be provided that the first digital recording and the second digital recording are stored in a first memory, the digital recording classified using the result of the second classification being provided in a second memory or being provided for storing in a second memory. The first memory is designed for rapid access times. The second memory may be designed for access times that are slower by comparison.

According to an example embodiment of the present invention, it may be provided that the result of the second classification includes one class, the class being determined using at least a part of the second digital recording that at least partially includes the object, the class being determined, which has a higher, in particular, the highest, probability compared to other classes of a plurality of classes, into which the object is classifiable. This class represents a best possible label.

The result of the second classification may include a probability of the class, the probability of the class being determined using at least a part of the second digital recording that at least partially includes the object. The probability represents a confidence measure for the quality of the classification. The classification may be improved as a result. The digital recordings selected in this way are particularly well suited for a training.

According to an example embodiment of the present invention, it may be provided that the digital recording classified using the result of the second classification and/or the first digital recording using the result of the second classification may be output, in particular, at a graphic user interface, either the digital recording classified using the result of the second classification being provided as a function of an input of a user, which confirms the result of the second classification, or otherwise the digital recording classified using the result of the second classification not being provided or being provided with another classification, in particular, a classification predefined by the input of the user. The user is able to recognize errors based on the classification and is able to eliminate or, if necessary, correct the applicable digital recordings. In this way, those segments and labels of the automatically generated relevant segments and labels are selected, which are particularly suited for a supervised learning.

According to an example embodiment of the present invention, it may be provided that the result of the second classification is checked during a check as a function of a digital recording, which is captured using another recording unit, in particular, at the second point in time or thereafter, either the digital recording classified using the result of the second classification being provided as a function of a result of the check, which confirms the result of the second classification, or otherwise the digital recording classified using the result of the second classification not being provided or being provided with another classification, in particular, a classification predefined by the check. An error may be recognized by a comparison with the other recording and the applicable digital recordings may be eliminated or, if necessary, corrected. In this way, those segments and labels of the automatically generated relevant segments and labels are selected, which are particularly suited for a supervised learning. A check may take place via a user or via an object recognition system.

According to an example embodiment of the present invention, a method for updating a machine-readable program code for object type recognition in a machine, in particular, in a vehicle, provides that a digital recording classified using the second classification determined according to the method as described above is received, a model for object type recognition is trained, in particular, in a supervised manner, using a set of classified digital recordings, the set including the digital recording classified using the second classification, a machine-readable program code for object type recognition being generated, which includes the model thus trained for object type recognition, and the machine-readable program code being transferred to the recording unit. In a system for machine learning, the model is trained and the model thus trained is deployed for use in an automated manner. In this way the machine learning is particularly effectively carried out.

According to an example embodiment of the present invention, a system for providing classified digital recordings, in particular, radar recordings, LIDAR recordings or camera recordings, for a system for automatic machine learning includes a recording unit, in particular, a radar system, a LIDAR system or a camera system, the recording unit being designed to capture at a first point in time a first digital recording, which includes an object, which is situated at the first point in time at a first distance from the recording unit, to determine a first classification of the object using the data of the first digital recording, to capture at a second point in time, in particular, after the first point in time a second digital recording, which includes the object, which is situated at the second point in time at a second distance from the recording unit, in particular, at a shorter range to the recording device compared to the first distance, to determine a second classification of the object using the data of the second digital recording, and to provide a digital recording classified using a result of the second classification, which includes at least a part of the first digital recording when a result of the first classification differs from the result of the second classification. The machine learning is improved using the digital recording classified in such a way.

According to an example embodiment of the present invention, the recording unit may include at least one processor, which is designed to store the first digital recording and the second digital recording in a first memory, and to provide the digital recording classified using the result of the second classification in a second memory or to provide for storing in a second memory. The memories may be thereby configured to be suitable to the requirements of access speed and costs.

According to an example embodiment of the present invention, the result of the second classification may include one class, the at least one processor being designed to determine the class using at least a part of the second digital recording that at least partially includes the object, the processor being designed to determine the class that has a higher, in particular, the highest, probability compared to other classes of a plurality of classes, into which the object is classifiable. Particularly relevant training data are determined as a result.

According to an example embodiment of the present invention, the result of the second classification may include a probability of the class, the at least one processor being designed to determine the probability of the class using at least a part of the second digital recording that at least partially includes the object. This enables a selection based on the confidence with respect to the accuracy of the classification.

According to an example embodiment of the present invention, the system may include a graphic user interface, which is designed to output the digital recording classified using the result of the second classification and/or the first digital recording using the result of the second classification, the at least one processor or the graphic user interface being designed either to provide the digital recording classified using the result of the second classification as a function of an input of a user, which confirms the result of the second classification, or otherwise not to provide the digital recording classified using the result of the second classification or to provide it with another classification, in particular, a classification predefined by the input of the user. This system makes it possible to exclude erroneous digital recordings from the training or to provide them with a correct label for the training.

According to an example embodiment of the present invention, the at least one processor may be designed to check the result of the second classification during a check, in particular, by a user or by an object recognition system, as a function of a digital recording, which is captured using another recording unit, in particular, at the second point in time or thereafter, the at least one processor being designed either to provide the digital recording classified using the result of the second classification as a function of a result of the check, which confirms the result of the second classification, or otherwise not to provide the digital recording classified using the result of the second classification or to provide it with another classification, in particular, a classification predefined by the check. This system makes it possible to exclude erroneous digital recordings from the training based on a comparison with the other recordings or to provide them with a correct label for the training.

According to an example embodiment of the present invention, a system for updating a machine-readable program code in a machine, in particular, in a vehicle, provides that the system is designed to receive a digital recording, classified using the second classification determined according to the method as ad described above, to train, in particular, in a supervised manner, a model for object type recognition using a set of classified digital recordings, the set including the digital recording classified using the second classification, to generate a machine-readable program code for object type recognition, which includes the model thus trained for object type recognition, and to transfer the machine-readable program code to the recording unit. This allows for machine learning without human intervention.

BRIEF DESCRIPTION OF THE DRAWINGS

Further advantageous specific embodiments of the present invention result from the following description and from the figures.

FIG. 5 shows exemplary approaches, according to the present invention.

DETAILED DESCRIPTION OF EXAMPLE EMBODIMENTS

An automated generation of relevant labeled data for automatic machine learning on the basis of a consistency requirement is described below. Data that result in a false classification during machine learning are considered to be relevant. "Automated" means that no manual labeling of the data is required.

The automated generation of relevant labeled data includes an automated identification of relevant data for a supervised learning. In one example, a continuous process is provided, which includes the following:
  recognition of relevant data,
  recognizing corresponding labels,
  training or retraining.

As a result, a self-improving system for driving a machine, in particular, a vehicle, is provided. The self-improving system may be employed, for example, within the scope of test drives, in a test vehicle or, with additional suitable safeguards, in a regular series-production vehicle.

A classification quality of object type recognition algorithms increases with decreasing distance. At a near distance, the recognition of an object type is technically easier to resolve than at a far distance. A range to the object is greater in the far distance than in the near distance. A real object type of a detected object is not subject to any temporal change. Thus, in a vehicle, it is possible when approaching, i.e., coming toward the object, to utilize a change of a detected object type class in order to identify data that are relevant for a training. Relevant recordings are those, which in the far distance result in a classification result that differs from the classification result in the near distance.

Recording refers, for example, to a digital image or to other digital data, for example, sensor data.

For reasons of cost-saving, the system and a method described below are designed in the example in such a way that a required data memory with rapid access time is small compared to a data memory with access time that is slower by comparison.

Figure 1:
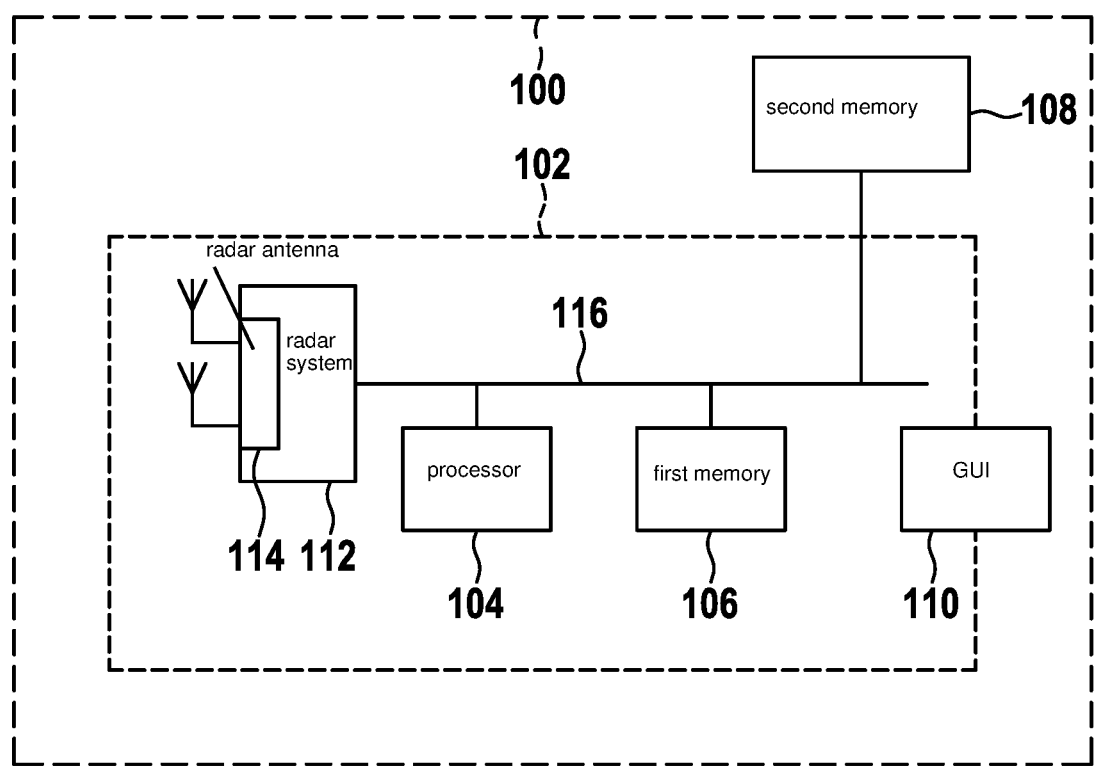
FIG. 1 schematically shows a representation of a system, according to an example embodiment of the present invention.

At least a part of a system 100 for providing classified digital recordings is schematically represented in FIG. 1.

System 100 in the example provides classified digital recordings for automatic machine learning.

System 100 includes a recording unit 102. Recording unit 102 is designed to capture digital recordings.

Recording unit 102 is designed to capture a first digital recording at a first point in time. Recording unit 102 is designed to capture a second digital recording at a second point in time. In the example, the second point in time is after the first point in time.

Recording unit 102 includes a processor 104. Processor 104 is designed to store the first digital recording and the second digital recording in a first memory 106.

Processor 104 is designed to determine a first classification for the first digital recording. Processor 104 is designed to determine a second classification for the second digital recording.

Processor 104 is designed to determine a classified digital recording, which is classified using the result of the second classification when the first classification differs from the second classification. The classified digital recording in the example includes at least a part of the first digital recording.

Processor 104 in the example is designed to provide the classified digital recording in a second memory 108. Processor 104 may be designed to provide the classified digital recording for storing in second memory 108.

System 100 may include a graphic user interface 110. Graphic user interface 110 is designed to output the digital recording classified using the result of the second classification and/or the first digital recording using the result of the second classification. In this way, a user is able to verify and/or to correct the automatic classification.

In the example, the at least one processor 104 is designed either to provide the digital recording classified using the result of the second classification as a function of an input of the user, which confirms the result of the second classification, or otherwise not to provide the digital recording classified using the result of the second classification. The user may thereby approve or not approve the automatic classification.

Instead of processor 104, graphic user interface 110 may be designed to provide or not to provide the digital recording classified using the result of the second classification as a function of the input of the user.

Processor 104 may be designed, instead of not providing the classified digital recording, to provide the classified digital recording with another classification. Processor 104 may be designed to determine and/or to predefine the other classification, in particular, via the input of the user. In this way, the user is able to correct the automatic classification.

Graphic user interface 110, instead of processor 104, may be designed to provide the digital recording classified using the other classification.

Recording unit 102 in the example includes a radar system 112 including at least one radar antenna 114. Radar system 112 is designed for capturing a radar recording. In the example, a digital recording captured by the radar system includes at least a part of the radar recording.

Instead of a radar recording, a LIDAR recording or a camera recording may be provided. Recording unit 102 may include a LIDAR system for capturing the LIDAR recording. Recording unit 102 may include a camera system for capturing the camera recording. Recording unit 102 may include radar system 112 and the camera system. Recording unit 102 may include radar system 112 and the LIDAR system. Recording unit 102 may include radar system 112 and the LIDAR system and the camera system.

Recording unit 102 in the example includes at least a part of a data link 116 for the communication of processor 104 with first memory 106, with second memory 108 and with radar system 112. At least parts of recording unit 102 may be implemented as a system-on-chip (SoC). Data link 116 may include a data bus situated in recording unit 102. The link to second memory 108 may include a radio link.

In FIG. 1, a block diagram includes recording unit 102. This may include a sensor. In the example, processor 104 is designed to store the following parameters in first memory 106.

Sakt: an instantaneous segment
Sold: an old segment
Srel: a relevant segment
dakt: an instantaneous distance
dold: an old distance
drel: a relevant distance
OTakt: an instantaneous object type
OTold: an old object type
OTrel: a relevant object type In the example, a segment is one part of a recording. A recording, which is captured by a radar sensor, includes in the example a spectrum. In the example, the segment of such a recording is a part of the spectrum.

First memory 106 in the example is designed as an SRAM. First memory 106 enables a writing of data, in particular, of the aforementioned parameters, with a high bandwidth.

A memory process is dominated with respect to an expenditure of computation time and with respect to computing resources, for example, bandwidth, or the storing of the segments Sakt, Sold and Srel.

Recording unit 102 in the example includes an object detector. The object detector is designed to carry out an object recognition on a captured digital recording. For example, processor 104 is designed to carry out the object recognition. An object in a digital recording is recognized using the object recognition. In the example, a segment of the digital recording that includes a recognized object is determined.

Processor 104 is designed to carry out an object type recognition. An object is classified using the object type recognition. In the example, processor 104 is designed to carry out the object type recognition for a segment, which includes a recognized object.

Second memory 108 in the example is designed as a flash memory. Processor 104 controls a sequence in recording unit 102, in particular, the memory process, the object recognition, the object type recognition and memory transfers from first memory 106 to second memory 108. The latter represent a main load.

In the example, radar sensors are used. These emit high-frequency signals and receive reflections from static and moving objects. The signals are received with the aid of antennas, are converted by electronics into electrical signals and transformed into digital signals with the aid of an analog-to-digital converter. Time signals are transformed into a frequency space with the aid of a primary signal processing, for example, a Fast Fourier transform. In a two-dimensional recording, a spectrum may be coded using color.

An object may be recognized in various ways. For example, a threshold detector is used. A distance of the recognized object to the sensor may be recognized, for example, by propagation time measurements or by phase shifts.

A quality of the object type recognition may be measured by an accuracy of the object type recognition over a distance of the radar sensor to the object. The greater the range of the correct recognition is, the better the driving behavior may be adapted to the situation.

The technical implementation of the object type recognition is possible in various ways. A signal processing concept or a data-based model or a hybrid model, i.e. a combination of signal processing and data-based model, may be provided.

With the aid of object detectors, selected segments of an instantaneous recording are fed, for example, to a convolutional neural network (CNN), which classifies the object type. The CNN in the example is trained to resolve this classification problem.

In the example, radar system 112 including the at least one radar antenna 114 are implemented as an SoC. Alternatively to an SoC, a System-in-Package or a discrete design may also be used.

First memory 106 in the example is designed as an On-Chip SRAM, i.e., as part of the SoC. It may be provided that first memory 106 is used for the parameters other than Srel, drel, OTrel and second memory 108 is used for the parameters Srel, drel, OTrel. Second memory 108 in the example is situated outside the SoC.

Figure 2:
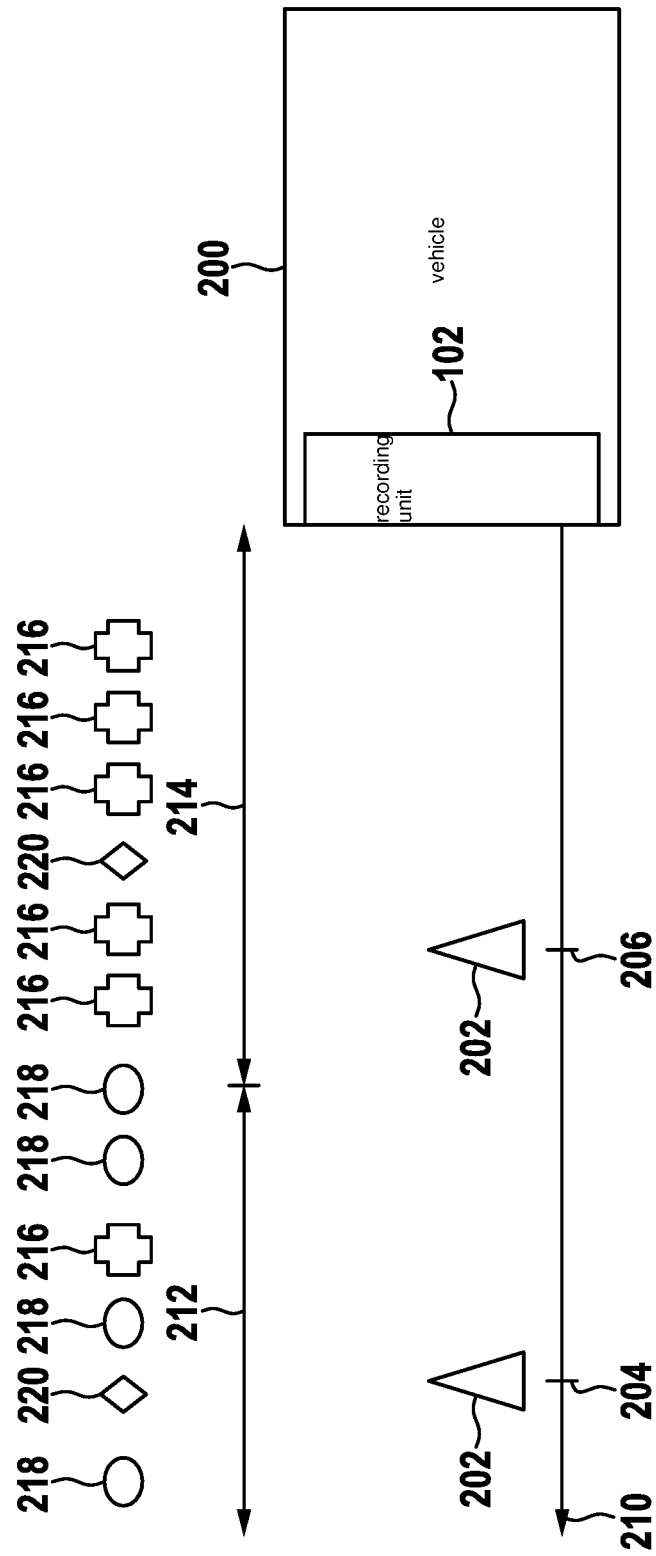
FIG. 2 schematically shows a representation of surroundings of a machine, according to an example embodiment of the present invention.

Surroundings of a machine are schematically represented in FIG. 2. The machine in the example is a vehicle 200. Vehicle 200 includes recording unit 102.

An object 202, a driver/rider of a two-wheeler in the example, is situated at the first point in time at a distance 204 from recording unit 102. Object 202 may also be another vehicle, a pedestrian, an animal, a manhole cover or another stationary object of a traffic infrastructure.

Recording unit 102 is designed to determine the first classification of object 202 using the data of the first digital recording.

Object 202 is situated at the second point in time at a second distance 206 from recording unit 102. Second distance 206 in this example is at a shorter range to recording unit 102 compared to first distance 204.

Recording unit 102 is designed to determine the second classification of object 202 using the data of the second digital recording.

FIG. 2 shows in the example an approach of vehicle 200 to an object 202, for example, a driver/rider of a two-wheeler crossing a driving direction 210 of vehicle 200. During the approach, a plurality of recordings is captured in the example, which includes the same real object 202. In the example, radar recordings are captured using a radar sensor.

At long distances, in the example at a first range 212, a recognized object type may frequently change. Upon closer approach, in the example at a range 214, a recognized object type converges into a real object type. FIG. 2 shows in the example a result of the object type recognition plotted over a distance. In the example, recordings are shown, in which object 202 is classified into one of the following object types. A recording is assignable to a point in time at which the recording originated. A recording is assignable to a distance to object 202, which is captured in the recording. Instead of a recording, a respective segment thereof is used in the example, which includes object 202. In the example, a first object type 216, a two-wheeler, a second object type 218, an automobile, and a third object type 220, an object that may be run over, are provided. FIG. 2 shows, with increasing distance from vehicle 200, the following:

three segments, in which object 202 is classified as first object type 216, one segment, in which object 202 is classified as third object type 220, two segments, in which object 202 is classified as first object type 216, two segments, in which object 202 is classified as second object type 218, one segment, in which object 202 is classified as first object type 216, one segment, in which object 202 is classified as second object type 218, one segment in which object 202 is classified as third object type 220, and one segment, in which object 202 is classified as second object type 218.

Other object types, for example, pedestrians, manhole covers, may be provided. Instead of third object type 220, differentiated object types for objects that may be run over may also be provided. First object type 216 and second object type 218 may also be combined into one object type, for example, an—object that may not be run over.

In the example, a first segment of recordings is captured when object 202 is located at a range of approximately 120 meters from vehicle 200. Further segments with recordings are captured in the example at different later points in time. Second area 214 in the example starts when object 202 is located at a range of approximately 6 meters from vehicle 200. A transition of the areas may also take place at another range. The areas may be provided in the system. Instead of using areas, the system may also operate without a division into areas.

Digital recordings that have resulted in a false classification with respect to the real object type are, in principle, relevant for the training.

A relevance of the data increases with the approach. The reliable classification at a near distance is more important than a classification at the far distance. In terms of a continuous improvement, an improvement of a classification quality is sought starting from minimal distances. In the example, the segment, which has been classified in second area 214 as third object type 220 is relevant, although object 202 is first object type 216. Recordings for this segment are captured in this example at approximately 4 meters of distance from recording unit 102.

Recording unit 102 is designed to carry out the classification for individual segments or for individual digital recordings. Recording unit 102 is designed to recognize digital recordings, which have resulted in a false classification with respect to the real object type. In the example, recording unit 102 is designed to recognize a first digital recording from second area 214, which is classified into an object type different from other digital recordings from second area 214.

Recording unit 102 may be designed to determine the first classification for the first digital recording. Recording unit 102 may be designed to determine the second classification for a second digital recording. Recording unit 102 may be designed to select the second digital recording from the other digital recordings from second area 214.

The result of the first classification in this example is third object type 220. The result of the second classification in this example is first object type 216.

Recording unit 102 is designed to provide the digital recording classified using the result of the second classification.

Recording unit 102 is designed to provide the digital recording classified using the result of the second classification. The classified digital recording in the example includes at least a part of the first digital recording when a result of the first classification differs from the result of the second classification.

In the example, the classified digital recording includes at least a part of object 202.

The result of the first classification in the example includes a first class. Processor 104 is designed to determine the first class using at least a part of the first digital image that at least partially includes object 202.

Processor 104 may be designed to determine the first class, which has a higher, in particular, the highest, probability compared to other classes of a plurality of classes, into which object 202 is classifiable.

Processor 104 may be designed to determine a probability of the respective class using at least a part of the first digital recording that at least partially includes object 202.

The result of the second classification in the example includes a second class. Processor 104 is designed to determine the second class using at least a part of the second digital recording that at least partially includes object 202.

Processor 104 may be designed to determine the second class, which has a higher, in particular, the highest, probability compared to other classes of the plurality of classes, into which object 202 is classifiable.

Processor 104 may be designed to determine a probability of the respective class using at least a part of the second digital recording that at least partially includes object 202.

Processor 104 in this example is designed to compare the result of the second classification and the result of the first classification. For example, a deviation is established when the second class is different from the first class.

The plurality of classes may characterize different object types. For example, the first class characterizes objects, which may be driven over. For example, the second class characterizes objects, which may not be driven over.

Processor 104 may be designed to check the result of the second classification during a check, in particular, via the user or via an object recognition system, as a function of a digital recording, which is captured using another recording unit. This digital recording in the example is a digital recording captured at the second point in time or thereafter by the other recording unit. The other recording unit in the example is situated relative to recording unit 102 in such a way that both capture an at least overlapping area that includes at least a part of object 202. The classified digital recording to be checked and the digital recording captured by the other recording unit include at least a part of the same object 202.

Processor 104 is designed either to provide the digital recording classified using the result of the second classification as a function of a result of the check, which confirms the result of the second classification, or otherwise not to provide the digital recording classified using the result of the second classification. Instead of not providing the classified digital recording, processor 104 may be designed to provide the classified digital recording using another classification. The other classification is predefined, for example, by the check.

System 100 may be designed to activate the machine, in particular, vehicle 200. Processor 104 is designed, for example, to activate the machine as a function of the object type. Processor 104 is designed, for example, to activate the machine to run over an object that may be run over, i.e., an object classified as able to be run over, and to avoid running over an object that is not able to be run over, i.e., an object classified as not able to be run over. The first classification and the second classification characterize, for example, the object type, in particular, able to be run over or not able to be run over.

System 100 may be designed to provide the classified digital recording for a system for automatic machine learning. System 100 may be part of the system for automatic machine learning.

Figure 3:
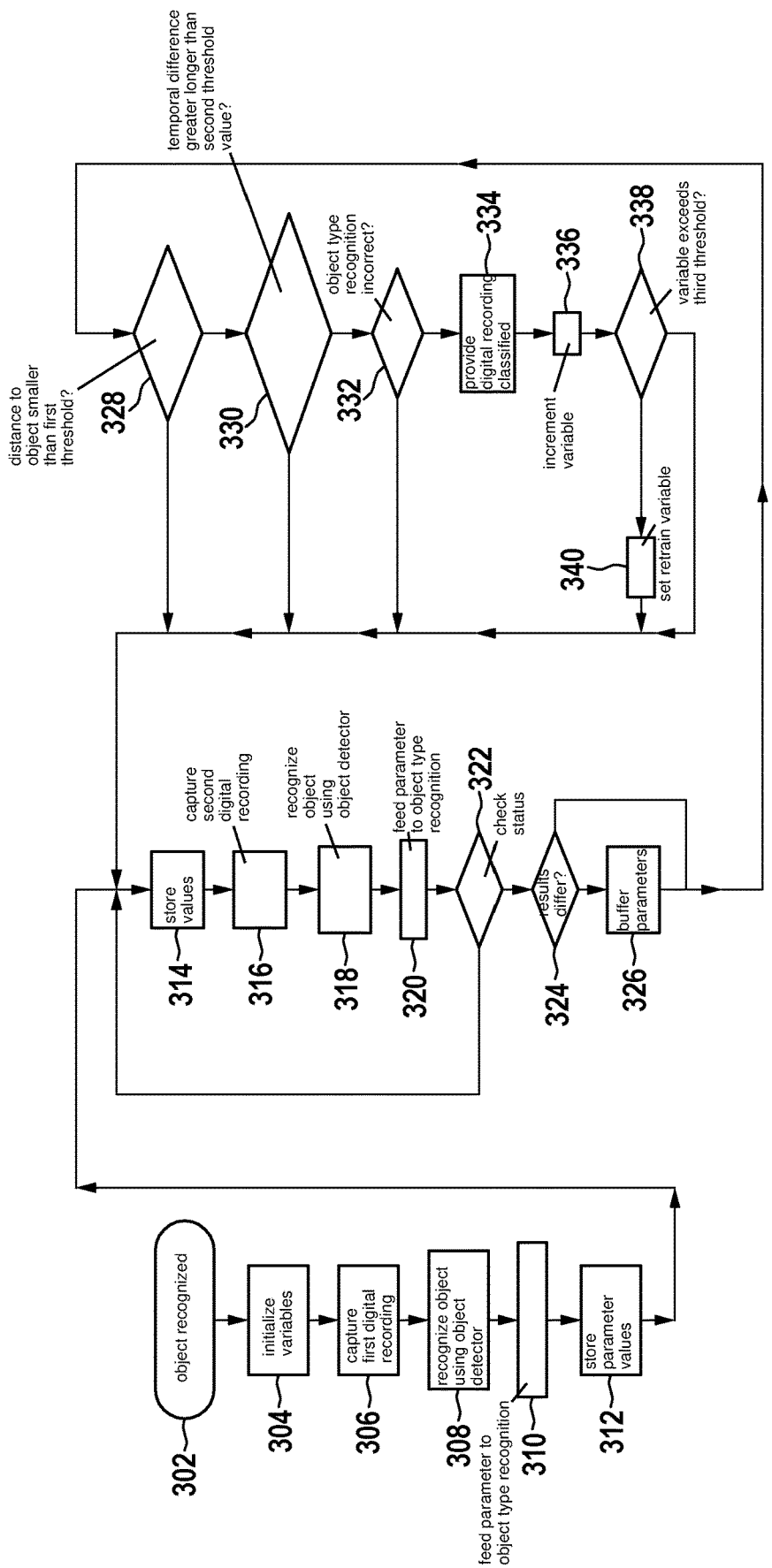
FIG. 3 shows steps in a first method, according to an example embodiment of the present invention.

A first method for providing classified digital recordings is described below with reference to FIG. 3.

The method starts in the example when a first digital recording is present. In the example, sensor data for the first digital recording are captured using the radar sensor.

In a step 302, an object is recognized by the object detector.

The object detector may include an artificial neural network, which is trained for recognizing objects. The artificial neural network may be trained to determine for a recognized object a segment, i.e., a part of the digital recording that includes the recognized object.

A step 304 is then carried out. In step 304, variables for the following parameters are initialized as follows:

n=1
retrigger=0
retrain=0

A status of the variable retrain is a function of a degree of filling of first memory 106 and is explained below.

Variable n in a first example characterizes a degree of filling of first memory 106. Variable n in a second example characterizes a degree of filling of second memory 108.

Variable n characterizes the degree of filling of the memory, in which classified digital recordings for the automatic machine learning are stored.

In the example, the classified digital recordings include relevant segments.

Which memory in the method is used for its storing is predefined, for example, by a design of recording unit 102. It may be provided to store values OTrel, Srel, drel in first memory 106 if this memory includes an SRAM, which is situated, in particular, in the SoC. It may be provided to store values OTrel, Sre, drel in second memory 108, in particular, when first memory 106 is too small for such purpose.

A step 306 is then carried out. In step 306, a first digital recording is captured. In the example, sensor data for the first digital recording are captured using the radar sensor.

A step 308 is then carried out. In step 308, an object is recognized using the object detector.

For example, an object is recognized using the trained artificial neural network and for this recognized object, a first segment, i.e., a part of the digital recording that includes the recognized object is determined.

The first segment, i.e., in the example, a section from a spectrum from the first digital recording, is stored in a variable for parameter Sakt. A first distance to the object is stored in a variable for parameter dakt. In the example, the first distance is estimated from the data of the first digital recording. The first distance is estimated, for example, using an estimator.

A step 310 is then carried out. In step 310, parameter Sakt is fed to the object type recognition. A result of the object type recognition, in the example, a first classification, is stored in a variable for parameter OTakt.

The object type recognition may include an artificial neural network, which is trained for recognizing object types. The artificial neural network may be trained to map a segment that includes a recognized object, i.e., a part of the digital recording, onto one object type of a plurality of possible object types. The object type in the example is determined using a classifier. The classifier in the example is designed to output from a plurality of classes a class for classifying the object. The classifier in the example is designed, for example, to output a quality of the classification.

A final level of the artificial neural network may be designed as a Softmax function. The object type recognition provides single probabilities for trained classes, which result in sum 1.

In the example, the class having the highest probability represents the primary result of the object type recognition. In the example, this is OTakt.

In addition, the probability of the classification may be output in a variable OTaktprob as a confidence measure.

The first classification in the example characterizes the object type.

A step 312 is then carried out. In step 312, the values of the instantaneous parameters are stored in variables for the relevant parameters:

OTrel=OTakt
Srel=Sakt
drel=dakt.

This is used in the example as an initialization in these variables.

A step 314 is then carried out. In step 314, the values of the instantaneous parameters are stored in variables for old parameters:

OTold=OTakt
Sold=Sakt
dold=dakt.

A step 316 is then carried out. In step 316, a second digital recording is captured. In the example, sensor data for the second digital recording are captured using the radar sensor.

A step 318 is then carried out. In step 318, an object is recognized using an object detector.

A second segment, i.e., in the example, a section from a spectrum from the second digital recording, is stored in a variable for parameter Sakt. A second distance to the object is stored in a variable for parameter dakt. The second distance in the example is estimated from the data of the first digital recording.

A step 320 is then carried out. In step 320, parameter Sakt is fed to the object type recognition. A result of the object type recognition, in the example, a second classification, is stored in a variable for parameter OTakt.

The second classification in the example characterizes an object type, in particular, able to be run over or not able to be run over.

In one example, the result of the second classification includes one class of a plurality of classes. The class in the example is determined using at least a part of the second digital recording that at least partially includes the object. The part of the second digital recording in the example is the second segment. In the example, the class is determined, which has a higher, in particular, the highest probability compared to other classes of the plurality of classes, into which the object is classifiable.

The result of the second classification in the example includes a probability of the class. The probability of the class is determined, for example, using at least a part of the second digital recording that at least partially includes the object.

A step 322 is then carried out. In step 322, the status of variable retrain is checked. If the status of variable retrain==1, step 314 is carried out. Otherwise, step 324 is carried out.

The status of variable retrain is a function of the degree of filling of the memory and is explained below.

In step 324, it is checked whether a result of the first classification differs from the result of the second classification. If the results differ from one another, a step 326 is carried out. Otherwise, a step 328 is carried out.

In the example, it is established by a comparison between OTakt and OTold whether or not a switch between the object types has been recognized.

In step 326, the values of the following parameters are buffered as follows:

OTrel=Sold
Srel=Sold
drel=dold

According to the first example, these values are stored in first memory 106.

According to the second example, these values are stored in second memory 108.

Step 328 is then carried out.

If the OTakt and OTold are identical, the previously stored relevant values are maintained.

In step 328, it is checked whether the instantaneous distance to the object is smaller than a first threshold value. The first threshold value in the example is a constant SHORTDIST. The first threshold value in the example is a value in a range of 3 to 10 meters, for example, 3 meters, 5 meters, 8 meters, or 10 meters.

In the example, it is checked via a comparison of the values of variable dakt with constant SHORTDIST whether the object is located in the near distance. In the near distance, the object type recognition is considered to be reliable. If the near distance is not reached, step 314 is carried out. Otherwise, step 330 is carried out.

It may be provided that it is also checked whether or not the classification takes place with a desired quality. It may be provided that step 314 is carried out, i.e., step 330 is not carried out if the quality of the classification is insufficient. For example, a sufficiently high quality of the classification is achieved if the confidence measure, in the example, variable OTaktprob, has a value that is greater than a threshold. The threshold in the example is 0.8.

In step 330, it is checked whether a temporal difference between a system time and a point in time of the last write operation in first memory 106 is longer than a second threshold value. In the example, the second threshold value is a constant RETRIGGER. The second threshold value in the example is a value in a range of 5 to 100 seconds, for example, 5 seconds, 20 seconds, 70 seconds or 100 seconds.

If the temporal difference is greater than the second threshold value, a step 332 is carried out. At this point in time in the program sequence, it is established that the segment stored in Srel is, in principle, relevant. Otherwise, step 314 is carried out.

In step 332, it is checked whether the object type recognition was not correct at any point in time and thus, in general, no relevant data may be present.

In the example, this takes place by a comparison of the values of OTrel with OTakt.

If OTrel differs from OTakt, a step 334 is carried out. Otherwise, step 314 is carried out.

In step 334, a digital recording classified using a result of the second classification is provided. The classified digital recording in the example includes relevant segment Srel. The result of the second classification in the example is a label therefor.

In the first example, relevant segment Srel is stored with the label on a memory space n in first memory 106.

In the second example, a transfer from first memory 106 into second memory 108 takes place. The transfer is made in the example to a memory space n in second memory 108.

In the example, relevant segment Srel=Sakt is stored. Relevant segment Srel in the example is stored with value OTrel=OTakt. Value OTrel in the example is the second classification. Value OTrel in the example represents the label for relevant segment Srel.

A decision is made about the correct label by the quality of the object type recognition in the near distance. In addition, it may be optionally provided to also use the confidence measure of the object type recognition.

One advantage of the first method is the automatic determination of labeled relevant data. Nevertheless, it may be meaningful to subject the automatically generated label to a later manual check.

Additionally or alternatively, a manual labeling may be considered. The manual labeling is preferably carried out with respect to data that are stored in a computer infrastructure. In the case of radar spectra, this is possible based on the spectra through an expert or through an artificial intelligence. For example, errors of the automatic labeling are recognized and corrected.

It may be provided that the result of the second classification is checked during a check as a function of a digital recording, which is captured using another recording unit.

At this point in time in the program sequence, it is clear that the segment stored in Srel is, in principle, relevant. It may be provided that a command is sent via a bus system in vehicle 200 to a front camera of vehicle 200 to record a photo of an instantaneous scene. This photo may be stored with the first digital recording and may be transferred into the computer infrastructure. This photo may be used as a reference for the manual labeling and/or may be confirmed using a video-based object type recognition of the object type. The check may take place offline in the computer infrastructure or online in vehicle 200.

In the example, a digital recording is captured at the second point in time or thereafter using a LIDAR sensor or a camera.

The digital recording classified using the result of the second classification is provided as a function of a result of the check, which confirms the result of the second classification.

Otherwise, the digital recording classified using the result of the second classification is, for example, not provided. It may be provided that the classified digital recording is otherwise provided with another classification, in particular, a classification predefined by the check.

The check may take place via an input of a user or via an object recognition system.

It may be provided that for checking by the user, the digital recording classified using the result of the second classification is output with the result of the second classification and/or of the other digital recording.

This output takes place, for example, at graphic user interface 110. This output may take place with the first digital recording.

It may be provided that an input of a user is captured, which either confirms or does not confirm the result of the second classification.

It may be provided that the digital recording classified using the result of the second classification is provided when the input confirms the result of the second classification. It may be provided that otherwise the digital recording classified using the result of the second classification is not provided. It may be provided that otherwise the classified digital recording is provided using another classification, in particular, a classification predefined by the input of the user.

A step 336 is then carried out. In step 336, variable n is incremented. Variable n describes the degree of filling of the second memory.

A step 338 is then carried out. In step 338, it is checked whether variable n exceeds a third threshold value. The third threshold value in the example is a constant BATCHSIZE. The third threshold value in the example is a value in a range of 1 to 100 samples, for example, 1 sample, 30 samples, 60 samples, or 100 samples. If variable n exceeds the threshold value, a step 340 is carried out. Otherwise, step 314 is carried out.

In step 340, variable retrain is set to 1. As a result, no further relevant segments are stored. Step 314 is then carried out.

Figure 4:
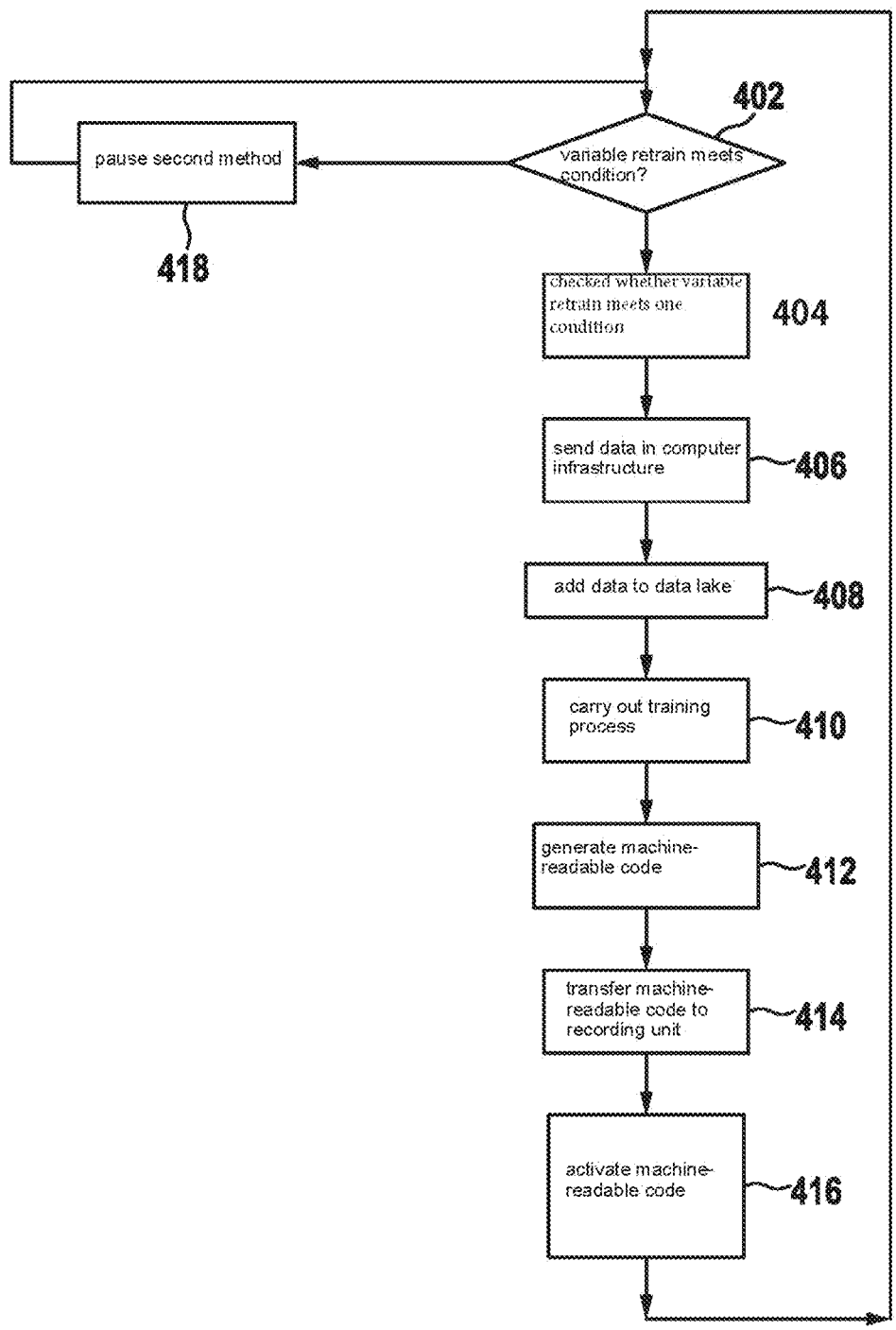
FIG. 4 shows steps in a second method, according to an example embodiment of the present invention.

A second method is described below with reference to FIG. 4. The second method proceeds in the example in parallel to the first method.

In a step 402, it is checked whether variable retrain meets one condition. In the example, the condition is met when variable retrain==1.

If the condition is met, a step 406 is carried out. Otherwise, a step 418 is carried out.

In step 418, the second method is paused. In the example, a number of seconds is awaited. In the example, the number is in the range between 5 and 500 second and is, for example, 5 seconds, 40 seconds, 120 seconds, or 500 seconds. Step 402 is then carried out.

For example, variable retrain is monitored at regular temporal intervals in a parallel task of a multitasking operating system.

When a sufficient amount of relevant data is present, i.e., the variable in the first method is set to the value retrain:=1, step 406 is carried out.

In step 406, data in the computer infrastructure are sent. These data include the digital recordings classified using the result of the respective second classification. In this way, the relevant segments and their labels are provided.

In the first example, the data from first memory 106 are sent by recording unit 102.

In the first example, the data from second memory 108 are sent. If the second part is situated in recording unit 102, the data are sent from the latter. If second memory 108 is situated outside recording unit 102, the data are sent from outside the latter.

A step 408 is then carried out. In step 408, the data are added to a data lake. A step 410 is then carried out.

In step 410 a training process for a model is carried out. The arrival of new data initiates the training process.

A step 412 is then carried out. In step 412, machine-readable program code for object type recognition is generated. In the example, the model is compiled to form a new firmware.

A step 414 is then carried out. In step 414, the machine-readable code, in the example the firmware, is transferred to recording unit 102.

For example, the firmware is stored on the SoC via FOTA.

A step 416 is then carried out. In step 416, the machine-readable program code, in the example, the new firmware, is activated. The variables are preferably re-initialized:

n=1
retrigger=0
retrain=0

Step 402 is then carried out.

In the example, the first method is continued by setting retrain=0.

FIG. 5 schematically represents exemplary approaches.

Two examples of a simulated exemplary approach to an object are represented in FIG. 5. An x-axis shows a distance in negative values to the object. An object type is plotted on a y-axis. The two examples involve an object having an arbitrarily selected numbering 3. The result of the classification by recording unit 102 is marked as points for the respective distances. In the first example, represented to the left in FIG. 5, object type 1 is falsely recognized for the object at the distance of 14 meters and object type 2 at the distance of 12 meters. At the remaining distances, the object is correctly classified, i.e., in object type 3. Recording 502 at a distance of −12 meters is identified as relevant by the first method. This recording is fed to second memory 108.

In the second example, represented to the right in FIG. 5, object type 1 is falsely recognized for the object at the distance of 13.5 meters and object type 2 at the distances between 12 meters and 8 meters. At the remaining distances, the object is correctly classified, i.e. in object type 3. Recording 504 at a distance of 8 meters is identified as relevant by the first method. This recording is fed to second memory 108.

It may be provided that based on a consistency requirement during operation, even data of the object classification are identified, for which no consistently correct classification could be achieved over time. These data are of particular importance for the neural network, since they reveal a weak point of the object type recognition in the respective instantaneous state.

Instead of the segment, i.e., a section of the digital recording, the digital recording may be stored in each case. In the example, the radar spectrum or a part thereof may be stored. The storing of the digital recording or of the spectrum requires larger memories, but may be useful for an analysis.

What is claimed is:

1. A computer-implemented method for providing classified digital recordings, including radar recordings or LIDAR recordings or camera recordings, for a system for automatic machine learning, the method comprising the following:

capturing a first digital recording at a first point in time using a recording unit activated by a processor, the recording unit including a radar system or a LIDAR system or a camera system, the first digital recording including an object, which is situated at the first point in time at a first distance from the recording unit;

determining, by the recording unit activated by the processor, a first classification of the object using data of the first digital recording;

recording, at a second point in time after the first point in time, a second digital recording using the recording unit activated by the processor, the second digital recording including the object, which is situated at the second point in time at a second distance from the recording unit, the second distance being at a shorter range from the recording unit compared to the first distance;

determining, by the recording unit activated by the processor, a second classification of the object using data of the second digital recording;

providing a digital recording classified using a result of the second classification, which includes at least a part of the first digital recording when a result of the first classification differs from the result of the second classification, wherein at least one of the first classification and the second classification characterizes the object as belonging to a first object type signifying that the object is on a road and able to be run over or as belonging to a second object type signifying that the object is on the road and not able to be run over by a vehicle.

2. The method as recited in claim 1, wherein the first digital recording and the second digital recording are stored in a first memory, the digital recording classified using the result of the second classification being provided in a second memory or being provided for storing in a second memory.

3. The method as recited in claim 1, wherein the result of the second classification includes one class, the class being determined using at least a part of the second digital recording that at least partially includes the object, the class being determined, which has a higher probability compared to other classes of a plurality of classes, into which the object is classifiable.

4. The method as recited in claim 3, wherein the result of the second classification includes a probability of the class, the probability of the class being determined using at least a part of the second digital recording that at least partially includes the object.

5. The method as recited in claim 1, wherein the digital recording classified using the result of the second classification and/or the first digital recording including the result of the second classification is output at a graphic user interface, either the digital recording classified using the result of the second classification being provided as a function of an input of a user, which confirms the result of the second classification, or otherwise the digital recording classified using the result of the second classification not being provided or being provided with another classification predefined by the input of the user.

6. The method as recited in claim 1, wherein the result of the second classification is checked during a check as a function of a digital recording which is captured using another recording unit at the second point in time or after the second point in time, wherein either the digital recording classified using the result of the second classification is provided as a function of a result of the check, which confirms the result of the second classification, or otherwise the digital recording classified using the result of the second classification not being provided or being provided with another classification predefined by the check.

7. A method for updating a machine-readable program code for object type recognition in a vehicle, the method comprising the following steps:
- capturing a first digital recording at a first point in time using a recording unit activated by a processor, the recording unit including a radar system or a LIDAR system or a camera system, the first digital recording including an object, which is situated at the first point in time at a first distance from the recording unit;
- determining, by the recording unit activated by the processor, a first classification of the object using data of the first digital recording;
- recording, at a second point in time after the first point in time, a second digital recording using the recording unit activated by the processor, the second digital recording including the object, which is situated at the second point in time at a second distance from the recording unit, the second distance being at a shorter range from the recording unit compared to the first distance;
- determining, by the recording unit activated by the processor, a second classification of the object using data of the second digital recording;
- providing a digital recording classified using a result of the second classification, which includes at least a part of the first digital recording when a result of the first classification differs from the result of the second classification training a model for object type recognition in a supervised manner using a set of classified digital recordings, the set including the digital recording classified using the second classification; and
- generating a machine-readable program code for object type recognition, which includes the model thus trained for object type recognition; and
- transferring the machine-readable program code to the recording unit, wherein at least one of the first classification and the second classification characterizes the object as belonging to a first object type signifying that the object is on a road and able to be run over or as belonging to a second object type signifying that the object is on the road and not able to be run over by a vehicle.

8. A system for providing classified digital recordings for a system for automatic machine learning, the system comprising:
- a processor;
- a recording unit including a radar system or a LIDAR system or a camera system, the recording unit, when activated by the processor, being configured to:
  - capture, at a first point in time, a first digital recording which includes an object which is situated at the first point in time at a distance from the recording unit,
  - determine a first classification of the object using the data of the first digital recording,
  - capture, at a second point in time after the first point in time, a second digital recording which includes the object which is situated at the second point in time at a second distance from the recording unit, the second distance being at a shorter range to the recording unit compared to the first distance,
  - determine a second classification of the object using the data of the second digital recording, and
  - provide a digital recording classified using a result of the second classification, which includes at least a part of the first digital recording when a result of the first classification differs from the result of the second classification, wherein at least one of the first classification and the second classification characterizes the object as belonging to a first object type signifying that the object is on a road and able to be run over or as belonging to a second object type signifying that the object is on the road and not able to be run over by a vehicle.

9. The system as recited in claim 8, wherein the recording unit includes at least one processor configured to store the first digital recording and the second digital recording in a first memory, and to: (i) provide the digital recording classified using a result of the second classification in a second memory, or (ii) provide for storing in a second memory the digital recording classified using the result of the second classification.

10. The system as recited in claim 8, wherein a result of the second classification includes one class, the at least one processor being configured to determine the class using at least a part of the second digital recording that at least partially includes the object, the processor being configured to determine the class, which has a higher probability compared to other classes of a plurality of classes, into which the object is classifiable.

11. The system as recited in claim 10, wherein the result of the second classification includes a probability of the class, the at least one processor being configured to determine the probability of the class using at least a part of the second digital recording that at least partially includes the object.

12. The system as recited in claim 8, wherein the system includes a graphic user interface which is configured to output the digital recording classified using the result of a second classification and/or the first digital recording using the result of the second classification, the at least one processor or the graphic user interface being configured, either to provide the digital recording classified using the result of the second classification as a function of an input of a user, which confirms the result of the second classification, or otherwise not to provide the digital recording classified using the result of the second classification or to provide it with another classification predefined by the input of the user.

13. The system as recited in claim 8, wherein the at least one processor is configured to check a result of the second classification during a check, via a user or via an object recognition system, as a function of a digital recording, which is captured using another recording unit at the second point in time or thereafter, the at least one processor being configured, either to provide the digital recording classified using the result of the second classification as a function of a result of the check, which confirms the result of the second classification, or otherwise not to provide the digital recording classified using the result of the second classification or to provide it with another classification predefined by the check.

14. A system for updating a machine-readable program code in a vehicle, the system being configured to:
- capture a first digital recording at a first point in time using a recording unit activated by a processor, the recording unit including a radar system or a LIDAR system or a camera system, the first digital recording including an object, which is situated at the first point in time at a first distance from the recording unit;
- determine, by the recording unit activated by the processor, a first classification of the object using data of the first digital recording;
- record, at a second point in time after the first point in time, a second digital recording using the recording unit activated by the processor, the second digital recording including the object, which is situated at the second point in time at a second distance from the recording unit, the second distance being at a shorter range from the recording unit compared to the first distance;

determine, by the recording unit activated by the processor, a second classification of the object using data of the second digital recording;

provide a digital recording classified using a result of the second classification, which includes at least a part of the first digital recording when a result of the first classification differs from the result of the second classification;

train in a supervised manner, a model for object type recognition using a set of classified digital recordings, the set including the digital recording classified using the second classification;

generate a machine-readable program code for object type recognition, which includes the trained model for object type recognition; and transfer the machine-readable program code to the recording unit, wherein at least one of the first classification and the second classification characterizes the object as belonging to a first object type signifying that the object is on a road and able to be run over or as belonging to a second object type signifying that the object is on the road and not able to be run over by a vehicle.

15. A non-transitory memory medium on which stored a computer program for providing classified digital recordings, including radar recordings or LIDAR recordings or camera recordings, for a system for automatic machine learning, the computer program, when executed by a computer, causing the computer to perform the following steps:

capturing a first digital recording at a first point in time using a recording unit activated by the computer, the recording unit including a radar system or a LIDAR system or a camera system, the first digital recording including an object, which is situated at the first point in time at a first distance from the recording unit;

determining, by the recording unit activated by the computer, a first classification of the object using data of the first digital recording;

recording, at a second point in time after the first point in time, a second digital recording using the recording unit activated by the computer, the second digital recording including the object, which is situated at the second point in time at a second distance from the recording unit, the second distance being at a shorter range from the recording unit compared to the first distance;

determining, by the recording unit activated by the computer, a second classification of the object using data of the second digital recording;

providing a digital recording classified using a result of the second classification, which includes at least a part of the first digital recording when a result of the first classification differs from the result of the second classification, wherein at least one of the first classification and the second classification characterizes the object as belonging to a first object type signifying that the object is on a road and able to be run over or as belonging to a second object type signifying that the object is on the road and not able to be run over by a vehicle.

16. The method as recited in claim 1, further comprising: providing a driver assistance system configured to control a drive of the vehicle in accordance with the digital recording classified using the result of the second classification.

17. The method as recited in claim 7, further comprising: providing a driver assistance system configured to control a drive of the vehicle in accordance with the machine-readable program code.

18. The system as recited in claim 8, further comprising: a driver assistance system configured to control a drive of the vehicle in accordance with the digital recording classified using the result of the second classification.

19. The system as recited in claim 14, further comprising: a driver assistance system configured to control a drive of the vehicle in accordance with the machine-readable program code.

20. The non-transitory memory medium as recited in claim 15, wherein a driver assistance system is configured to control a drive of the vehicle in accordance with the digital recording classified using the result of the second classification.

* * * * *